United States Patent
Sussman

[11] 3,807,835
[45] Apr. 30, 1974

[54] FOUR COMPONENT MICROSCOPE EYEPIECE
[75] Inventor: Milton H. Sussman, Amherst, N.Y.
[73] Assignee: American Optical Corporation, Southbridge, Mass.
[22] Filed: Sept. 5, 1972
[21] Appl. No.: 285,984

[52] U.S. Cl. .............................. 350/220, 350/175 E
[51] Int. Cl. ............................................ G02b 25/00
[58] Field of Search ........................ 350/175 E, 220

[56] References Cited
UNITED STATES PATENTS

| | | | |
|---|---|---|---|
| 3,384,434 | 5/1968 | Scidmore et al. | 350/175 E UX |
| 3,464,764 | 9/1969 | Scidmore et al. | 350/175 E UX |
| 3,352,620 | 11/1967 | Scidmore et al. | 350/175 E UX |

Primary Examiner—John K. Corbin
Attorney, Agent, or Firm—Alan H. Spencer; William C. Nealon

[57] ABSTRACT

This invention relates to a microscope eyepiece having a magnification of substantially 15.5X, a real field of view diameter of 15.5 millimeters, and an apparent field of view of substantially 51.4°.

3 Claims, 1 Drawing Figure

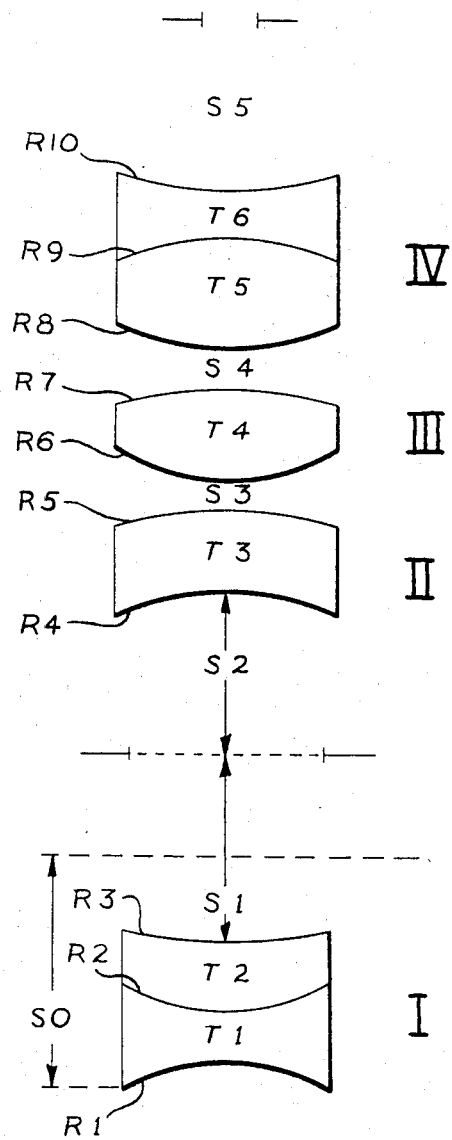

FOUR COMPONENT MICROSCOPE EYEPIECE

BACKGROUND OF THE INVENTION

This invention relates to improvements in an eyepiece to be used on a microscope and having a real field of view diameter of 15.5 millimeters, and an apparent field of view of substantially 51.4°. The eyepiece is used as part of a complete viewing system using an appropriately designed telescope objective and prisms.

Among the objects of this invention are to provide an eyepiece which will incorporate with associated telescope components the prisms and together be corrected for the usual axial and field aberrations such as distortion field curvature and coma. In the instant case, of particular importance is the excellent correction of the Petzval curvature and pupillary spherical aberrations and color thus eliminating annoying shadows in the field as the eye of the viewer moves slightly.

The exit pupil lies beyong the last vertex a distance at least equal to the focal length, a feature which provides comfortable viewing with and without eyeglasses.

The lateral color of the viewing system is designed to compensate the opposite value of lateral color which is provided by a series of objectives to be used with this eyepiece. An additional desirable feature of the eyepiece of this invention is that the diaphragm defining the field seen by the observer is not afflicted with the strong red-orange fringe found in the usual compensating eyepiece.

DRAWING

The drawing is an optical diagram of a microscope eyepiece according to the present invention.

DESCRIPTION

Numerical values for a successful version of the eyepiece according to the present invention in terms of F, its real focal length, are given in the following table.

The parameters of the lens element which make up the objective are listed in the following table in which ND is the refractive index for the D line of sodium and $\gamma$ is the Abbe number. Radii (R), thicknesses (T), and spacings (S) are expressed in millimeters and a negative sign indicates lens radii on centers of curvature on the object side of the lens.

TABLE I

| Radius R | Thickness T | Space S | Refractive Index ND | Abbe Number $\nu$ |
|---|---|---|---|---|
| | | S0=–1.5949F | | |
| R1=–13.3015F | | | | |
| | T1=0.1117F | | ND1=1.51742 | $\nu$1=52.2 |
| R2=+1.1829F | | | | |
| | T2=0.1551F | | ND2=1.78472 | $\nu$2=25.8 |
| R3=+2.375F | | | | |
| | | S1=1.6483F | | |
| | | S2=0.9184F | | |
| R4=–4.2864F | | | | |
| | T3=0.5283F | | ND3=1.62090 | $\nu$3=60.3 |
| R5=–1.9143F | | | | |
| | | S3=0.031F | | |
| R6=2.7550F | | | | |
| | T4=0.3064F | | ND4=1.62090 | $\nu$4=60.3 |
| R7=–9.1404 F | | | | |
| | | S4=0.031F | | |
| R8=1.1342F | | | | |
| | T5=0.3421F | | ND5=1.62090 | $\nu$5=60.3 |
| R9=–2.4344F | | | | |
| | T6=0.1117F | | ND6=1.78472 | $\nu$6=25.8 |
| R10=3.5762F | | | | |
| | | S5=1.023F | | |

The foregoing parameters of radius, thickness, and spacings are functions of the equivalent focal length F of the eyepiece. The value of F as an example is 16.126 millimeters. In this focal length, the absolute values of the foregoing data are as follows:

TABLE II

| Radius R | Thickness T | Space S | Refractive Index ND | Abbe Number $\nu$ |
|---|---|---|---|---|
| | | S0=–25.72 | | |
| R1=–214.5 | | | | |
| | T1=1.801 | | ND1=1.51742 | $\nu$1=52.2 |
| R2=19.075 | | | | |
| | T2=2.501 | | ND2=1.78472 | $\nu$2=25.8 |
| R3=38.3 | | | | |
| | | S1=26.58 | | |
| | | S2=14.81 | | |
| R4=–69.122 | | | | |
| | T3=8.519 | | ND3=1.62090 | $\nu$3=60.3 |
| R5=–30.87 | | | | |
| | | S3=0.5 | | |
| R6=44.428 | | | | |
| | T4=4.941 | | ND4=1.62090 | $\nu$4=60.3 |
| R7=–147.398 | | | | |
| | | S4=0.5 | | |
| R8=18.29 | | | | |
| | T5=5.517 | | ND5=1.62090 | $\nu$5=60.3 |
| R9=–39.257 | | | | |
| | T6=1.802 | | ND 6=1.78472 | $\nu$6=25.8 |
| R10=57.67 | | | | |
| | | S5=16.5 | | |

In the foregoing tables, negative signs represent concave radii going from left to right.

I would like to make the following comments. The apparent excess precision implied by the large number of decimal places is somewhat fictitious for a number of reasons. For instance, varying the radii (larger in particular) by several millimeters would produce only minimal changes, mostly in the focal lengths. The same applies to thicknesses where 0.1 – 0.2 millimeter variation would not adversely affect performance. In fact, large regions of design exist (assuming that radii and thickness were properly balanced).

Thus, it should be understood by those skilled in the art that the lens design data is accurate within about ± 3 percent.

Having thus described the invention in detail and with sufficient particularity to enable those skilled in the art to practice it, what is desired to have protected by Letters Patent is set forth in the following claims.

What is claimed is:

1. A four component microscope eyepiece having a magnification of substantially 15.5X, a real field of view diameter of 15.5 millimeters, and an apparent field of view of substantially 51.4°, said eyepiece characterized by excellent correction of the Petzval curvature and pupillary spherical aberrations of a degree sufficient to eliminate substantially all shadows in field as the eye of a viewer moves slightly while looking through the eyepiece, the exit pupil characterized in being beyond the last vertex a distance at least equal to the focal length, thereby enabling comfortable viewing with and without eyeglasses, said eyepiece additionally characterized by a diaphragm defining the field seen by an observer not being afflicted with readily observable red-orange fringes and comprising the following components in sequential optical alignment: A front doublet consisting of a double concave negative element cemented to a meniscus positive element; a second element II consisting of a concavo-convex positive lens; a third element III consisting of a double convex lens, and a back doublet IV consisting of a double convex lens element cemented to a double concave negative lens element.

2. The microscope eyepiece of claim 1 in which the parameters of lens radii (R), thicknesses (T), and spacings (S) are expressed in millimeters and a negative sign indicates lens radii on centers of curvature on the object side of the lens.

TABLE II

| Radius R | Thickness T | Space S | Refractive Index ND | Abbe Number $\nu$ |
|---|---|---|---|---|
| | | S0=−1.5949F | | |
| R1=−13.3015F | | | | |
| | T1=0.1117F | | ND1=1.51742 | $\nu$1=52.2 |
| R2=+1.1829F | | | | |
| | T2=0.1551F | | ND2=1.78472 | $\nu$2=25.8 |
| R3=+2.375F | | | | |
| | | S1=1.6483F | | |
| | | S2=0.9184F | | |
| R4=−4.2864F | | | | |
| R5=−1.9143F | T3=0.5283F | | ND3=1.62090 | $\nu$3=60.3 |
| R6=2.7550F | | S3=0.031F | | |
| R7=−9.1404F | T4=0.3064F | | ND4=1.62090 | $\nu$4=60.3 |
| R8=1.1342F | | S4=0.031F | | |
| R9=−2.4344F | T5=0.3421F | | ND5=1.62090 | $\nu$5=60.3 |
| R10=3.5762F | T6=0.1117F | | ND6=1.78472 | $\nu$6=25.8 |
| | | S5=1.023F | | |

3. The microscope eyepiece of claim 2 in which F = 16.126.

* * * * *